United States Patent [19]

Rainville

[11] 4,239,475
[45] Dec. 16, 1980

[54] APPARATUS FOR MAKING ORIENTED CONTAINERS

[75] Inventor: Dewey Rainville, Westfield, N.J.

[73] Assignee: Rainville Company, Inc., Middlesex, N.J.

[21] Appl. No.: 970,382

[22] Filed: Dec. 18, 1978

[51] Int. Cl.³ .................................................. B29C 17/07
[52] U.S. Cl. .................................... 425/526; 264/538; 425/533; 425/534
[58] Field of Search ............... 425/526, 533, 534, 540; 264/538

[56] References Cited

U.S. PATENT DOCUMENTS

| | | | |
|---|---|---|---|
| 3,850,562 | 11/1974 | Takeuchi et al. | 425/533 X |
| 3,984,513 | 10/1976 | Mulraney | 264/538 |
| 4,063,867 | 12/1977 | Janniere | 425/534 X |

Primary Examiner—Jan H. Silbaugh
Attorney, Agent, or Firm—John M. Calimafde; Roy C. Hopgood; Charles W. Neill

[57] ABSTRACT

The injection blow molding machine of this specification moves oriented containers. Parisons applied to core rods move from an injection mold to a conditioning station that provides time for the full thickness of the parison to come to the same temperature. The parisons are then transferred, by a transfer device, to other core rods on a second indexing head of the machine which carries the parisons to a stretch-blow station at which they are stretched to obtain orientation. After the parisons are blown to final size, they are stripped from the core rods of the second indexing head. The transfer device turns the parisons to 180° in a plane of their axial length in order to transfer them from one core rod to another.

14 Claims, 4 Drawing Figures

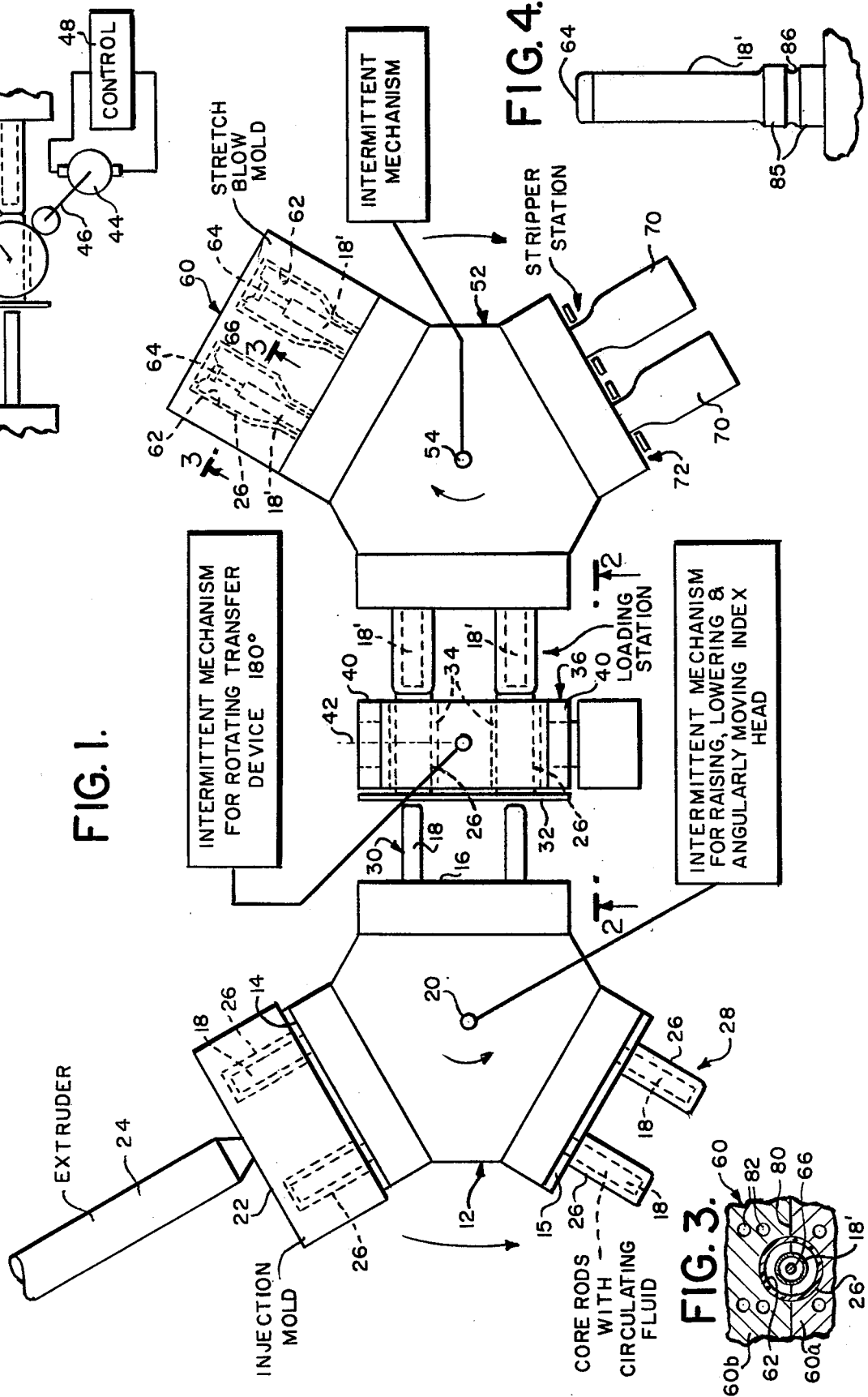

4,239,475

APPARATUS FOR MAKING ORIENTED CONTAINERS

BACKGROUND AND SUMMARY OF THE INVENTION

The plastic containers made on blow molding machines have substantially greater strength for their weight if the plastic material is stretched biaxially while at orientation temperature.

This invention provides time for a parison on a core rod to come to a uniform temperature throughout the full wall thickness and provides method for stretching the plastic lengthwise of the container and stretching it also circumferentially to obtain biaxial orientation.

A novel feature of the apparatus is the provision of two indexing heads which carry different sets of core rods; and the transfer of parisons from core rods of the first indexing head to other core rods of the second indexing head while the parisons are at elevated temperatures.

Parisons are stripped from core rods and moved into recesses of a transfer device which turns the parisons through an angle of 180° so that the open end of the parison can be applied to an aligned core rod of a second indexing head.

Other objects and advantages of the invention will appear or be pointed out as the description proceeds.

BRIEF DESCRIPTION OF DRAWING

In the drawing, forming a part hereof, in which like references characters indicate corresponding parts in all the views:

FIG. 1 is a diagrammatic top plan view of a blow molding machine made in accordance with this invention;

FIG. 2 is a diagrammatic side elevation of the transfer device shown in FIG. 1;

FIG. 3 is a fragmentary sectional view, on an enlarged scale, taken on the line 3—3 of FIG. 1; and FIG. 4 is a detail view, on an enlarged scale, of a portion of one of the core rods.

DESCRIPTION OF PREFERRED EMBODIMENT

The blow molding machine of this invention includes a conventional indexing head 12 which has three angularly related peripheral faces 14, 15 and 16 from which core rods 18 extend. The table 12 rotates about a center axis 20; and is rotated by intermittent mechanism for raising, lowering and angularly moving the indexing head in accordance with conventional practice.

In FIG. 1, there is an injection mold 22 with mold cavities to which hot plastic is supplied by an extruder 24. The clearance between the core rods 18 and the cavities of the injection mold 22 are filled with molten plastic, and thus the space between the dotted lines in the mold 22 represents parisons 26 within the injection mold 22. A stripper plate 32 has openings that fit closely around the core rods 18 so that the structure of the plate 32 around these openings in the plate close the ends of the injection mold cavities.

After each injection operation, the mold 22 opens and the indexing head 12 rises to cause the core rods 18 and parisons 26 to clear the lower portions of the cavities in the mold 22, and the indexing head then rotates about its center 20 to bring the parisons 26 to a conditioning station 28 which represents a 120° movement of the indexing head 12 around its center 20.

On the next operation of the indexing head 12, the core rods 18 at the conditioning station 28 are moved another 120° to a transfer station 30.

There may not be any equipment at the conditioning station 28, but the time that it takes the parisons 26 to travel from the injection mold 22, and to dwell at the conditioning station 28 and then resume movement to the transfer station 30, gives the parisons 26 a chance to cool in temperature below that of the plastic in the injection mold 22. More importantly, it gives the plastic of the parisons 26 time to equalize in temperature throughout the full thickness of the parisons. If desired, the core rods 18 can be made with passages for circulating fluid through the interior of the core rods. Such circulation of fluid facilitates the bringing of the wall thickness of the parisons to uniform temperature. Also, if desired, externally zoned heating or cooling could be supplied from a separate apparatus.

At the transfer station 30 the stripper plate 32 ejects the parisons 26 from the core rods 18 and moves the parisons 26 into chambers 34 in a transfer device 36.

As the stripper plate 32 ejects the parisons 26 from the core rods 18, the closed end of each parison enters the chamber 34 first, and when the parison 26 is fully inserted into the chamber 34, the open end of the parison 26 is flush, or protruding slightly from, the left-hand end of the chamber 34, and the closed end of the parison 26 is flush with or projects slightly beyond the right-hand end of the chamber 34.

The stripper 32 returns to its retracted position, and the transfer device 36 rotates in bearings 40 about an axis 42 through an angle of 180°.

FIG. 2 shows the cylindrical shape of the transfer device 36 and shows a motor 44 which intermittently rotates the transfer device 36 about its axis 42 through motion-transmitting connections 46. A control 48 operates the transfer device 36 in timed relation with the operation of the indexing head 12 so as to turn each parison 26 through an angle of 180°, so that the closed end of the parison is at the left, and the open end at the right, as viewed in FIGS. 1 and 2.

There is a second indexing head 52, similar to the indexing head 12 and rotatable about an axis 54. Core rods 18' project from the angularly spaced faces of the indexing head 52, and when the indexing head 52 is in the position shown in FIG. 1, core rods 18' project toward the transfer device 36 in alignment with the core rods 18 projecting from the face 16 of the first indexing head 12. These core rods 18' are in alignment with the core rods 18 of the faces 16; and after the transfer device 36 has turned the parisons 26 in the chambers 34 through 180°, the open ends of the parisons in the chambers 36 are adjacent to the left-hand ends of the core rods 18'.

The next time the stripper 32 ejects parisons from the core rods 18, the closed ends of these ejected parisons contact with the closed ends of the parisons in the chambers 34 of the transfer device 36 and push the parisons in the chambers 34 toward the indexing head 54 and cover the core rods 18' until the core rods 18' extend into the full length of the parisons ejected from the transfer device.

The indexing head 52 rotates about its axis 54 to bring the core rods 18' to a stretch blow mold 60 which has cavities 62 therein for receiving the core rods 18'. These core rods 18' have contact areas 64 at the ends of rods 66 which telescope into and out of the core rods 18' so as to stretch the parisons 26 in the direction of the length of the core rods, and at the same time or subsequently, to blow the parisons 26, so that they are stretched circumferentially as well as stretched axially. This produces biaxial orientation while the plastic of the parisons is within the orientation temperature range.

When blown to full cavity size, the parisons are removed by opening the mold 60, raising the indexing head 52, and rotating the head 52 angularly to bring the blown parisons, which now constitute blown articles 70 to a stripper station 72 at which the blown articles 70 are stripped from the cores and discharged into a container or conveyor by which they are taken away as finished products of the blow molding machine.

The intermittent mechanism for raising, lowering and angularly moving the indexing head 12 and 52, and the control for operating the motor 44 that rotates the transfer device 36 are coordinated to move their respective mechanisms in timed relation with one another. Control mechanisms for intermittent movements of blow molding machines are well known, and no description of them is necessary for a complete understanding of this invention.

FIG. 3 is a sectional view taken on the line 3—3 of FIG. 1 and shows the structure of FIG. 1, and, in addition, a lower stationary portion 60a of the mold 60 and an upper movable portion 60b, which separates from the lower portion 60a along a plane of separation 80. FIG. 3 also shows cooling chambers 82 through which fluid is circulated to cool the walls of the cavity 62, so that the plastic will harden quickly when it comes in contact with the walls of the cavity. This produces a hardening of the plastic so that the articles blown in the mold can be removed promptly upon completion of the blowing operation.

FIG. 4 is a detail view of one of the core rods 18' with the contact area 64 retracted into contact with the rest of the core rod 18'.

FIG. 4 also shows a circumferential groove 86 in the neck section 85 of core rod 18'. The purpose of this groove is to permit the parison to shrink into the groove when the parison is fully applied over the length of the core rod 18' at the transfer station. Engagement of the inside surface of the parison with the groove 86 at the transfer station prevents the parison from sliding off the core rod 18' as a result of centrifugal force when the indexing head 52 (FIG. 1) rotates quickly from the transfer station to the stretch blow mold 60. The groove could also be used in conjunction with or replaced by a tight fit between the parison 26 and the core rod 18' in the neck station 85 only. FIG. 4 also shows how the core rod 18' is reduced in diameter from the neck section 85 to its end so that there will be no uneven contact which might cause uneven temperature changes in the parison 26. The lack of contact also facilitates axial stretching before blowing.

The preferred embodiment of the invention has been illustrated and described, but changes and modifications can be made and some features can be used in different combinations without departing from the invention as defined in the claims.

What is claimed is:

1. Blow molding apparatus for making plastic containers including in combination a first indexing head having an injection station, a treating station and a stripper station at angularly spaced locations around the perimeter of the first indexing head, a second indexing head having angularly related operational stations including a transfer station, a blow station and a stripper station around the perimeter of the second indexing head, core rods extending from the angularly related faces of both indexing heads, a transfer device located between the stripper station of the first indexing head and the transfer station of the second indexing head, and means to move the transfer device into a position to receive parisons stripped from core rods of the first indexing head, and into a position to supply parisons, that have been stripped from the first indexing head, to core rods of the second indexing head.

2. The blow molding apparatus described in claim 1 characterized by means for controlling the temperature of the injection molds and cores of the first indexing head to allow for conditioning of the parisons during transfer between said cores of the first and second indexing heads and during stripping from said cores of the first head and during movement into the transfer device and during removal from the transfer device to the second indexing head, during conveyance to a stretch-blow station, and prior to stretch-blowing in the stretch-blow station, the means for controlling temperature being correlated to permit such conditioning to bring the full thickness of the parisons on the core rods to nearly uniform orientation temperature.

3. The blow molding apparatus described in claim 2 characterized by the stripper station of the first indexing head including a transfer device to which parisons on core rods are transferred when core rods are brought to the stripper station of the first indexing head, and parison holders of the transfer device in position to receive parisons stripped from the core rods of the first indexing head.

4. The blow molding apparatus described in claim 3 characterized by a bearing by which the transfer device is supported, for rotation through 180° to reverse the position of each parison that is received from the stripper station of the first indexing head.

5. The blow molding apparatus described in claim 1 characterized by the second indexing head having its transfer station in position to receive a parison from the transfer device to core rods on the second indexing head when said core rods are at the transfer station.

6. The blow molding apparatus described in claim 5 characterized by the transfer device being rotatable about an axes extending substantially normal to the longitudinal axis of the core rods of the first and second indexing head when the core rods are in line with the transfer device, means for rotating the transfer device about its said axis for 180° after each transfer of a parison between the transfer device and the core rods of either of the indexing heads.

7. The blow molding apparatus described in claim 6 characterized by the core rod of the first indexing head being in alignment with a recess in the transfer device when the stripper station moves a parison from said core rod of the first indexing head into the recess in the transfer device, the parison being of a cross-section correlated with the recess so as to displace a parison already in the recess and already turned 180° by the previous rotation of the transfer device.

8. The blow molding apparatus described in claim 7 characterized by a core rod of the second indexing head being in alignment with the transfer device and in position to receive the parison from the recess of the transfer device onto the core rod of the second indexing head.

9. The blow molding apparatus described in claim 1 characterized by intermittent operating mechanism for rotating the two indexing heads and correlated to stop when core rods of the different indexing heads are in alignment to transfer a parison from the first indexing head into the aligned cavity of the transfer device at the stripper station of the first indexing head, and to displace onto a core rod of the second indexing head a parison that is in the recess of the transfer device.

10. The blow molding apparatus described in claim 1 characterized by the blow station of the second indexing head including a blow mold having a cavity into which core rods of the second indexing head extend successively as the second indexing head makes successive intermittent angular movements, means for stretching the parison on each core rod at the blow mold.

11. The blow molding apparatus described in claim 10 characterized by the blow mold of the second indexing head including mechanical means in the core rods that move longitudinally in the direction to stretch the length of the parison in the direction of the extent of the core rods, and means for blowing the parison to obtain stretch of the parison at right angles to the direction in which it is stretched by said means in the core rod to obtain biaxial orientation.

12. The blow molding apparatus described in claim 11 characterized by the blow mold being a mold in which a movable section and a relatively fixed section enclose a blow cavity in which parisons are stretched biaxially while at orientation temperatures, and the stripper station beyond the blow mold and to which blown articles are carried by intermittent angular movements of the second indexing head.

13. A blow molding apparatus for blow molding hollow articles including a combination a first indexing head with core rods extending from angularly related faces of the first indexing head, parison providing means associated with the first indexing head, intermittently movable mechanism for moving core rods in unison with the angular movement of the indexing head, a second indexing head with core rods extending from angularly related faces of the second indexing head, blow molding means associated with the second indexing head, intermittently movable mechanism for moving core rods in unison with the angular movement of the second indexing head, both of the indexing heads being movable into positions where a core rod on one head is in alignment with a core rod on the other head, and a transfer device that receives a parison from the first head and that turns it around and places it on the core rod of the second head.

14. The blow molding apparatus described in claim 13 characterized by means for stripping a parison from the core rod of the first head, the parison being hollow and closed at its front end but open at its rearward end, bearings on which the transfer device rotates to rotate the parison and brings the closed end of the parison into position with said closed end nearest to the first head and its open end nearest to a core rod on the second head, so that the closed end of the next parison from the first head contacts with the closed end of the parison in the transfer device and displaces the open end of the parison in the transfer device over an end of a core rod projecting from the second head.

* * * * *